(12) United States Patent
Brebion et al.

(10) Patent No.: US 10,277,957 B2
(45) Date of Patent: Apr. 30, 2019

(54) METHOD FOR DELIVERING AN AUDIO-VIDEO LIVE CONTENT IN MULTICAST FORM

(71) Applicant: BROADPEAK, Rennes (FR)

(72) Inventors: Rêmy Brebion, Rennes (FR); Dominique Colombel, Rennes (FR); Jacques Le Mancq, Rennes (FR)

(73) Assignee: BROADPEAK, Rennes (FR)

( * ) Notice: Subject to any disclaimer, the term of this patent is extended or adjusted under 35 U.S.C. 154(b) by 0 days.

(21) Appl. No.: 15/327,172

(22) PCT Filed: Jul. 30, 2015

(86) PCT No.: PCT/EP2015/067587
§ 371 (c)(1),
(2) Date: Jan. 18, 2017

(87) PCT Pub. No.: WO2016/016398
PCT Pub. Date: Feb. 4, 2016

(65) Prior Publication Data
US 2017/0164067 A1 Jun. 8, 2017

(30) Foreign Application Priority Data
Jul. 31, 2014 (EP) .................................. 14306227

(51) Int. Cl.
*H04N 21/6405* (2011.01)
*H04N 21/236* (2011.01)
(Continued)

(52) U.S. Cl.
CPC ..... *H04N 21/6405* (2013.01); *H04L 65/4076* (2013.01); *H04L 65/608* (2013.01);
(Continued)

(58) Field of Classification Search
CPC .......... H04N 21/6405; H04N 21/2187; H04N 21/23439; H04N 21/236; H04N 21/4384;
(Continued)

(56) References Cited

U.S. PATENT DOCUMENTS

2008/0013563 A1* 1/2008 Sasaki .................. H04L 12/185
370/442
2009/0198827 A1* 8/2009 Hughes .............. H04N 7/17318
709/231
(Continued)

FOREIGN PATENT DOCUMENTS

JP 2008-227621 A 9/2008
WO 2010/054719 A1 5/2010

OTHER PUBLICATIONS

Dec. 21, 2015 Search Report issued in International Patent Application No. PCT/EP2015/067587.
(Continued)

*Primary Examiner* — Hunter B Lonsberry
(74) *Attorney, Agent, or Firm* — Oliff PLC; R. Brian Drozd

(57) ABSTRACT

For delivering an AV live content, time being divided into transmission periods, the AV live content being divided into chunks, a server performs: obtaining at least one multicast reference stream intended to transport one chunk per transmission period; obtaining at least one multicast side stream intended to transport, for each transmission period, a plurality of chunks which at least includes the same chunk as in each multicast reference stream and at least one preceding chunk; and synchronously transmitting each multicast reference stream and each multicast side stream along the transmission periods. A device willing to receive the AV live content performs: joining one multicast side stream for obtaining at least one chunk transmitted in a first transmission period; and switching to one multicast reference stream
(Continued)

Figure 1:
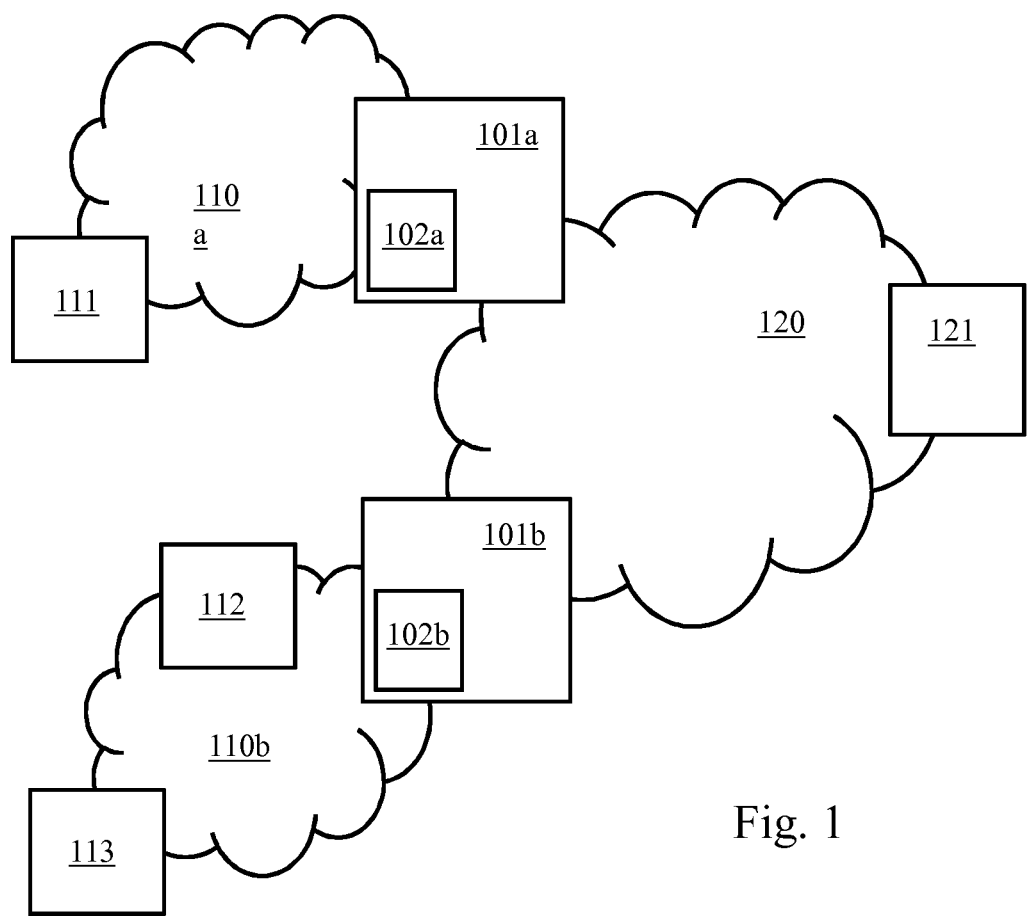

for obtaining subsequent chunks which are transmitted from a second transmission period following the first transmission period.

16 Claims, 5 Drawing Sheets

(51) Int. Cl.
    *H04N 21/438*     (2011.01)
    *H04N 21/2343*     (2011.01)
    *H04N 21/845*     (2011.01)
    *H04N 21/854*     (2011.01)
    *H04L 29/06*     (2006.01)
    *H04N 21/2187*     (2011.01)

(52) U.S. Cl.
    CPC ......... *H04L 65/80* (2013.01); *H04N 21/2187* (2013.01); *H04N 21/236* (2013.01); *H04N 21/23439* (2013.01); *H04N 21/4384* (2013.01); *H04N 21/8456* (2013.01); *H04N 21/85406* (2013.01)

(58) Field of Classification Search
    CPC .......... H04N 21/8456; H04N 21/85406; H04L 65/608
    See application file for complete search history.

(56) References Cited

U.S. PATENT DOCUMENTS

| | | | |
|---|---|---|---|
| 2011/0202965 A1* | 8/2011 | Henry | H04N 7/17318 |
| | | | 725/110 |
| 2016/0005440 A1* | 1/2016 | Gower | H04N 21/4756 |
| | | | 386/241 |
| 2017/0026712 A1* | 1/2017 | Gonder | H04L 65/605 |

OTHER PUBLICATIONS

Dec. 21, 2015 Written Opinion issued in International Patent Application No. PCT/EP2015/067587.

Fuchs et al; "Optimizing channel change time in IPTV applications;" 2008 IEEE International Symposium on Broadband Multimedia Systems and Broadcasting; XP031268571; pp. 1-8.

* cited by examiner

METHOD FOR DELIVERING AN AUDIO-VIDEO LIVE CONTENT IN MULTICAST FORM

BACKGROUND OF THE INVENTION

The present invention generally relates to delivering an audio-visual content to a client device, an interconnecting device interconnecting a first network to a second network, the client device being connected to the second network, an equipment adapted to provide the audio-visual content being connected to the first network.

In the past, most video live streaming technologies relied on streaming protocols such as RTP ("Real-time Transport Protocol", as defined in the normative document RFC 3550) or RTSP ("Real-Time Streaming Protocol", as defined in the normative document RFC 2326). Today's live streaming technologies are almost exclusively based on the HTTP ("HyperText Transfer Protocol", as defined in the normative document RFC 2616) protocol and designed to work efficiently over large and distributed HTTP networks such as the Internet.

Adaptive Bitrate Streaming (ABS) is one popular HTTP streaming technique used in streaming contents over computer networks and HLS ("HTTP Live Streaming"), which is a live streaming communications protocol based on HTTP and developed by Apple Inc., is one particular implementation. HLS works by breaking the overall AV ("Audio-Video") stream into a sequence of small HTTP-based file downloads, each containing one chunk of an overall potentially unbounded transport stream. The AV content is thus divided into chunks, wherein a chunk is a portion of the AV content, whatever is the actual resolution, which corresponds to a time segment of the AV content. As the AV stream is played, a client device decoding the AV content may select from a quantity of different alternate versions containing the same material encoded at various respective bit rates, allowing the streaming session to adapt to available network resources and/or available processing resources of the client device. At the start of the streaming session, the client device downloads a playlist in the form of a text file with an M3U, or m3u8, file extension. This text file contains the metadata for the various streams which are available for the concerned AV content. The various streams that correspond to the respective bit rates are also referred to as layers.

A similar ABS approach is implemented by Smooth Streaming, which is a feature of Internet Information Services (IIS) Media Services, an integrated HTTP-based media delivery platform provided by Microsoft Corp. Contrary to HLS wherein the AV stream is truncated in plural files containing chunks complemented with playlist files, Smooth Streaming relies on a single AV file truncated into pieces, each piece of file containing a descriptor indicating the concerned layer and a reference time in the AV content. Protocol basis and benefits are however equivalent.

One may similarly consider Adobe Systems' HTTP Dynamic Streaming (HDS) and Dynamic Adaptive Streaming over HTTP, a multimedia streaming technology developed by the Moving Picture Experts Group, and referred to as MPEG DASH, which is related to HDS, HLS and Smooth Streaming.

HTTP-based streaming technologies are very convenient, as HTTP allows going through firewalls and guarantees data integrity by relying on TCP ("Transmission Control Protocol", as defined by the normative document RFC 793). However, the unicast nature of HTTP in the context of ABS is creating huge scalability issues for CDN ("Content Delivery Network") operators that prevent them from adopting ABS-based mechanisms for live streaming. Indeed, HTTP-based streaming technologies can be unsustainable in terms of back-end infrastructure, since numerous users may request watching an AV live content substantially at the same time.

In view of such drawbacks of the HTTP-based streaming technologies for live AV content delivery, many operators rely on multicast-based live streaming technologies. It allows sizing the back-end infrastructure in a more cost-effective way, since numerous users attempting accessing the AV live content substantially at the same time results only in numerous requests for joining an already-setup multicast stream, which has a limited impact on the back-end infrastructure processing. Since live streaming is performed in such a multicast context and since most client devices require buffering a predefined quantity N of chunks before starting decoding the AV live content, joining an already-setup multicast stream results in a startup latency contradictory to a QoE ("Quality of Experience") level that the CDN operators expect to provide to their users. In other words, the users would have to wait that buffers be filled in before being able to enjoy the AV live content. Buffering the predefined quantity N of chunks before starting decoding the AV live content allows compensating jitter and, when the client devices rely on unicast connections with an intermediary device converting the multicast data of the AV live content into unicast data, allows compensating potential retransmission occurring within the unicast connections. It should be noticed that relying on multicast transmission for AV live content doesn't allow the client devices to retrieve past chunks, since the AV content is live and cannot be watched on-demand.

Such a startup latency can be avoided by envisaging an hybrid version of the aforementioned technologies, namely downloading the first N chunks in a unicast way to fill in the buffers and join an already-setup multicast stream for the subsequent chunks. Such a process might be implemented in a gateway interconnecting a local network LAN ("Local Area Network") to which the client device is connected and a backbone network WAN ("Wide Area Network") via which the backend infrastructure provides the AV live content. However, the scalability issue related to the unicast way of requesting the first N chunks remains, which is thus still an issue for sizing the back-end infrastructure delivering the AV live content. For example, when a soccer game or another broadcast live event starts, numerous users would attempt accessing the AV live content substantially at the same time, which results in numerous substantially simultaneous unicast requests addressed to the back-end infrastructure.

The aforementioned startup latency issue is thus QoE-related. QoE aspects also concern error recovery when the device willing to receive the AV live content encounters an error when receiving a chunk of the AV live content. Whereas error recovery might be easily implemented in a unicast context with retransmission mechanism, such error recovery when an error is encountered when receiving a chunk of the AV live content is an issue in a multicast context.

It shall be noted that such issues arise in the more general context of AV live content delivery based, whether the bitrate of streams transporting the audio-visual contents be adaptive or fixed.

It is desirable to overcome the aforementioned drawbacks of the prior art. It is more particularly desirable to provide a solution that allows increasing QoE from the standpoint of a device willing to receive an AV live content.

It is in particular desirable to provide a solution that allows increasing QoE by reducing the aforementioned startup latency undergone by the device willing to receive the AV live content. It is also in particular desirable to provide a solution that allows increasing QoE by allowing error recovery when the device willing to receive the AV live content encounters an error when receiving a chunk of the AV live content.

It is further particularly desirable to provide a solution that overcomes the aforementioned scalability issue for sizing the back-end infrastructure intended to provide the AV live content. It is further particularly desirable to provide a solution that acts in a transparent manner for supporting legacy client devices.

It is also particularly desirable to provide a solution that operates in the context of adaptive streaming, thus allowing users to benefit from availability of different alternate versions of the AV live content encoded at various respective bit rates.

It is also particularly desirable to provide a solution that is simple and cost-effective.

SUMMARY OF THE INVENTION

To that end, the present invention concerns a method for delivering an audio-video live content, time being divided into transmission periods, the audio-video live content being divided into chunks. The method is such that a server device performs: obtaining at least one multicast reference stream intended to transport one chunk of the audio-video live content per transmission period; obtaining at least one multicast side stream intended to transport, for each transmission period, a plurality of chunks of the audio-video live content which at least comprises the same chunk as in each multicast reference stream and at least one preceding chunk; and synchronously transmitting each multicast reference stream and each multicast side stream along the transmission periods. The method is further such that a device willing to receive the audio-video live content performs: joining one said multicast side stream for obtaining at least one chunk of the audio-video live content transmitted in a first transmission period; and switching to one said multicast reference stream for obtaining subsequent chunks of the audio-video live content which are transmitted from a second transmission period following the first transmission period. Thus, in view of the chunks present in the multicast side stream(s) per transmission period compared to the chunks present in the multicast reference stream(s), QoE can be improved from the standpoint of the device willing to receive the audio-video live content. Moreover, the aforementioned scalability issue for sizing the back-end infrastructure intended to provide the AV live content, i.e. the server device, is overcome.

According to a particular feature, in each transmission period, the chunks transported by each multicast side stream are transported in a reverse sequence order with regard to the audio-video live content. Thus, QoE is even more improved in cases where the multicast side stream is joined whereas a transmission period has already been started, i.e. at least one chunk present in said transmission period has already been transmitted or started to be transmitted when joining the multicast side stream.

According to a particular feature, the server device obtains and transmits plural multicast reference streams transporting chunks in respective resolutions and a single multicast side stream, one multicast reference stream being selected to perform said switching according to a resolution of the audio-video live content desired by the device willing to receive the audio-video live content. Thus, switching in between multicast streams has no impact on the resolution on the retained chunks, which improves QoE.

According to a particular feature, the multicast side stream transports chunks having a resolution identical as the lowest resolution of the audio-video live content transported among the multicast reference streams. Thus, a single multicast side stream allows improving QoE with reduced network resources consumption.

According to a more particular feature, the audio-video live content being compliant with the HyperText Transport Protocol Live Streaming (HLS) format, each multicast reference stream includes in each transmission period a playlist compliant with the HyperText Transport Protocol Live Streaming format and the multicast side stream includes in each transmission period an aggregation of the playlists included in the multicast reference streams in said transmission period. Thus, compliance with HLS is ensured.

According to an alternate particular feature, the audio-video live content being compliant with the Smooth Streaming format, each multicast reference stream includes in each transmission period timestamp information compliant with the Smooth Streaming format and the multicast side stream includes in each transmission period a copy of the timestamp information included in any multicast reference stream in said transmission period. Thus, compliance with Smooth Streaming is ensured.

According to a particular feature, the server device obtains and transmits plural multicast reference streams transporting chunks in respective resolutions and plural multicast side streams transporting chunks in said respective resolutions, one multicast reference stream being selected to perform said switching according to the resolution of the chunks of the multicast side stream from which said switching is performed. Thus, no resolution change occurs from the standpoint of the device willing to receive the audio-video live content.

According to a more particular feature, the audio-video live content being compliant with the HyperText Transport Protocol Live Streaming format, each multicast reference stream includes in each transmission period a playlist compliant with the HyperText Transport Protocol Live Streaming format and each multicast side stream includes in each transmission period a copy of the playlist included, in said transmission period, in the multicast reference stream having the same resolution as said multicast side stream. Thus, compliance with HLS is ensured.

According to an alternate particular feature, the audio-video live content being compliant with the Smooth Streaming format, each multicast reference stream includes in each transmission period timestamp information compliant with the Smooth Streaming format and the multicast side stream includes in each transmission period a copy of the timestamp information included, in said transmission period, in the multicast reference stream having the same resolution as said multicast side stream. Thus, compliance with Smooth Streaming is ensured.

According to a particular feature, the steps of the method performed by the device willing to receive the audio-video live content are initiated when the device willing to receive the audio-video live content starts accessing the audio-video live content. Thus, reduced startup latency is achieved for getting the audio-video live content.

According to a particular feature, the steps of the method performed by the device willing to receive the audio-video live content are initiated when the device willing to receive the audio-video live content already receives chunks of the audio-video live content via one said multicast reference stream, detects an error in one said received chunks and then switches to one said multicast side stream to obtain at least the chunk detected in error. Thus, error recovery is achieved when getting the audio-video live content.

According to a particular feature, a network interconnecting device interconnecting a first network to a second network, a client device being connected to the first network, the server device being connected to the second network, the device willing to receive the audio-video live content is the network interconnecting device on behalf of the client device and the network interconnecting device converting data received in a multicast way from the server device into data transmitted in a unicast way to the client device. Thus, legacy client devices relying on unicast communications can benefit from the QoE improvement, thanks to a use of such network interconnecting device, e.g. a residential gateway.

The present invention also concerns a system for delivering an audio-video live content, time being divided into transmission periods, the audio-video live content being divided into chunks, the system comprising a server device having: means for obtaining at least one multicast reference stream intended to transport one chunk of the audio-video live content per transmission period; means for obtaining at least one multicast side stream intended to transport, for each transmission period, a plurality of chunks of the audio-video live content which at least comprises the same chunk as in each multicast reference stream and at least one preceding chunk; and means for synchronously transmitting each multicast reference stream and each multicast side stream along the transmission periods. The system further comprises at least one device willing to receive the audio-video live content having: means for joining one said multicast side stream for obtaining at least one chunk of the audio-video live content transmitted in a first transmission period; and means for switching to one said multicast reference stream for obtaining subsequent chunks of the audio-video live content which are transmitted from a second transmission period following the first transmission period.

The present invention also concerns a server device intended to be used in a system for delivering an audio-video live content, time being divided into transmission periods, the audio-video live content being divided into chunks, the server device comprising: means for obtaining at least one multicast reference stream intended to transport one chunk of the audio-video live content per transmission period; means for obtaining at least one multicast side stream intended to transport, for each transmission period, a plurality of chunks of the audio-video live content which at least comprises the same chunk as in each multicast reference stream and at least one preceding chunk; and means for synchronously transmitting each multicast reference stream and each multicast side stream along the transmission periods.

The present invention also concerns a device intended to be used in a system for delivering an audio-video live content, time being divided into transmission periods, the audio-video live content being divided into chunks Said device comprises: means for joining a multicast side stream for obtaining at least one chunk of the audio-video live content transmitted in a first transmission period; and means for switching to a multicast reference stream for obtaining subsequent chunks of the audio-video live content which are transmitted from a second transmission period following the first transmission period, wherein the multicast reference stream transports one chunk of the audio-video live content per transmission period and the multicast side stream transports, for each transmission period, a plurality of chunks of the audio-video live content which at least comprises the same chunk as in the multicast reference stream and at least one preceding chunk, and wherein the multicast reference stream and the multicast side stream are synchronously transmitted along the transmission periods.

The present invention also concerns a computer program that can be downloaded from a communication network and/or stored on a medium that can be read by a processing device. This computer program comprises instructions for causing implementation of the aforementioned method in any one of its embodiments, when said program is run by a processor. The present invention also concerns information storage means, storing such a computer program.

LIST OF FIGURES

Figure 2:
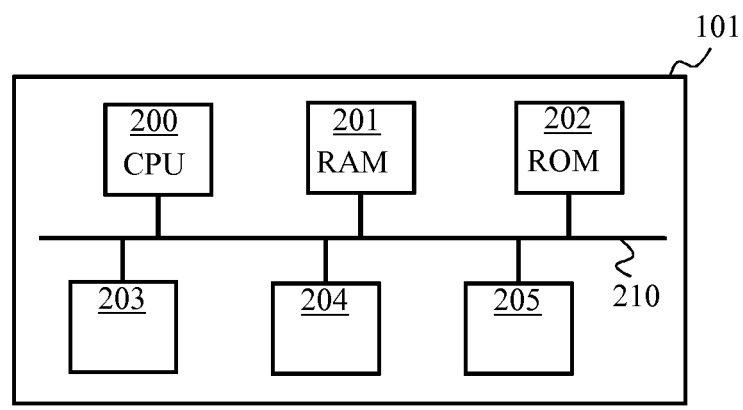
Figure 3A:
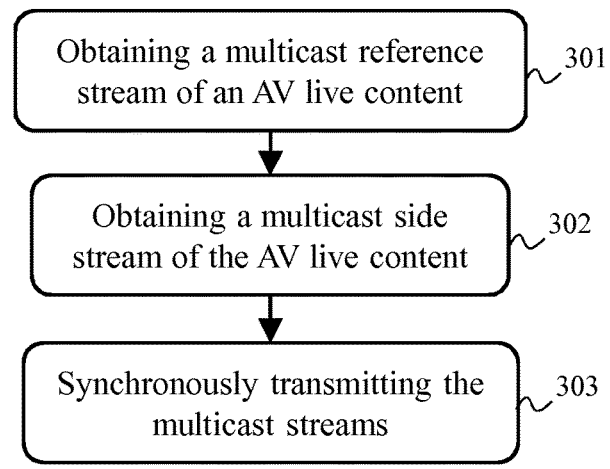
Figure 3B:
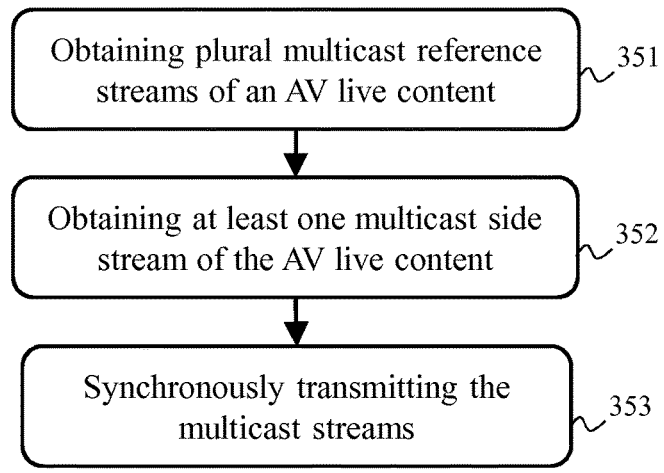
Figure 4A:
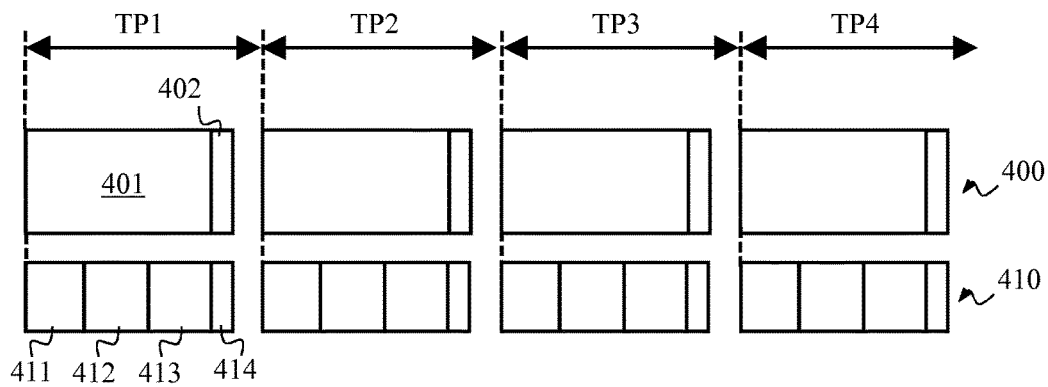
Figure 4B:
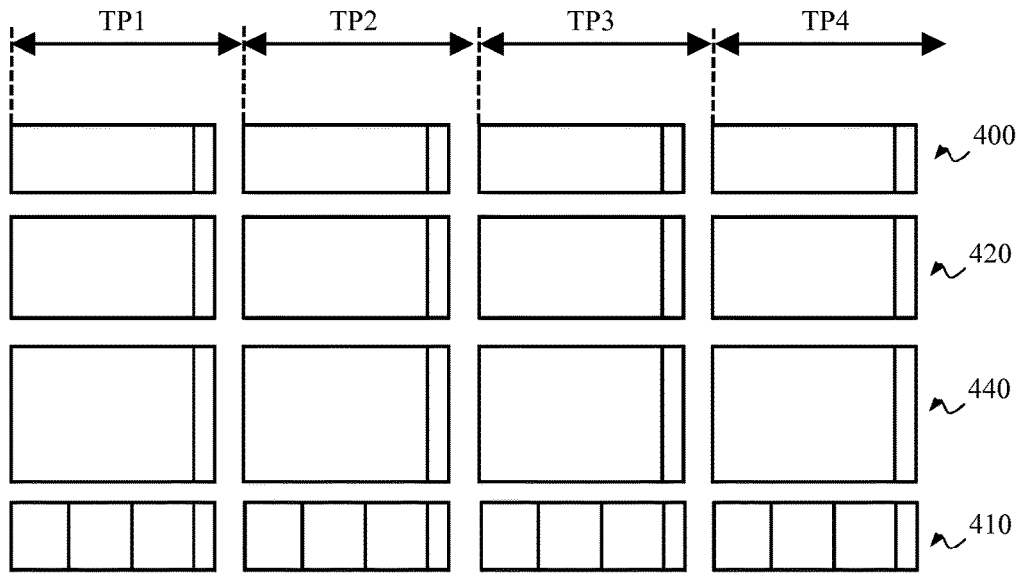
Figure 4C:
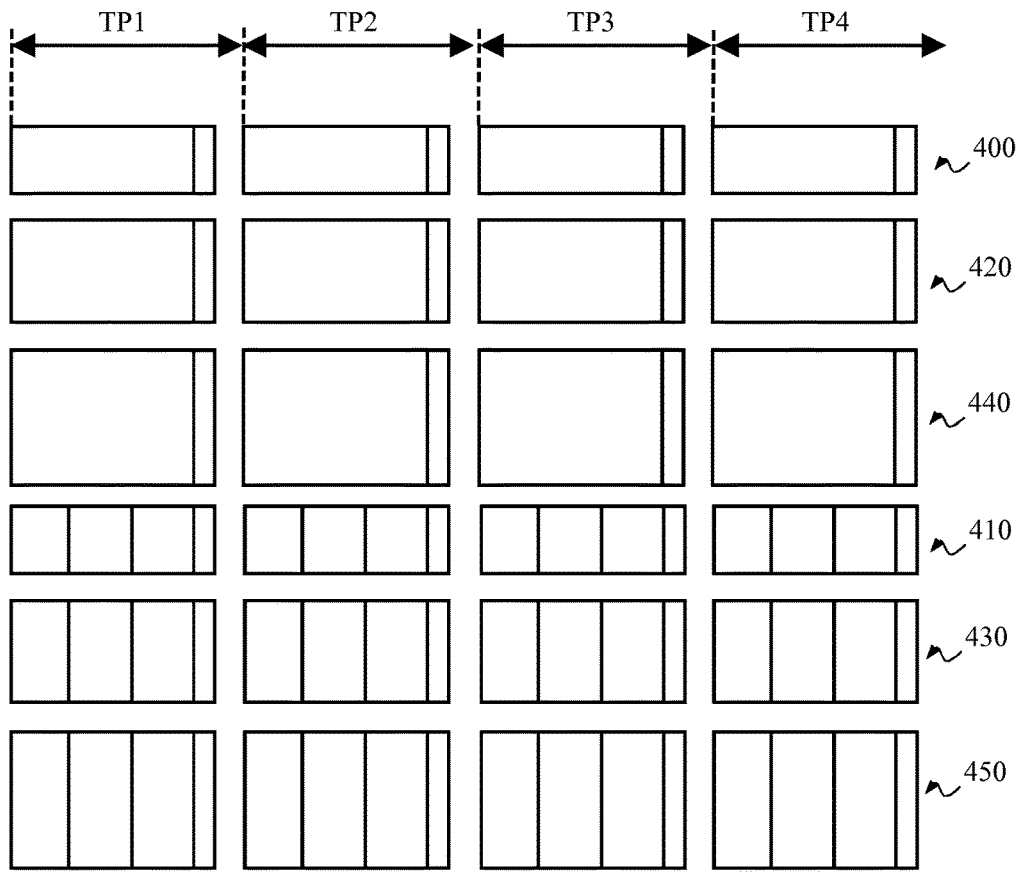
Figure 5:
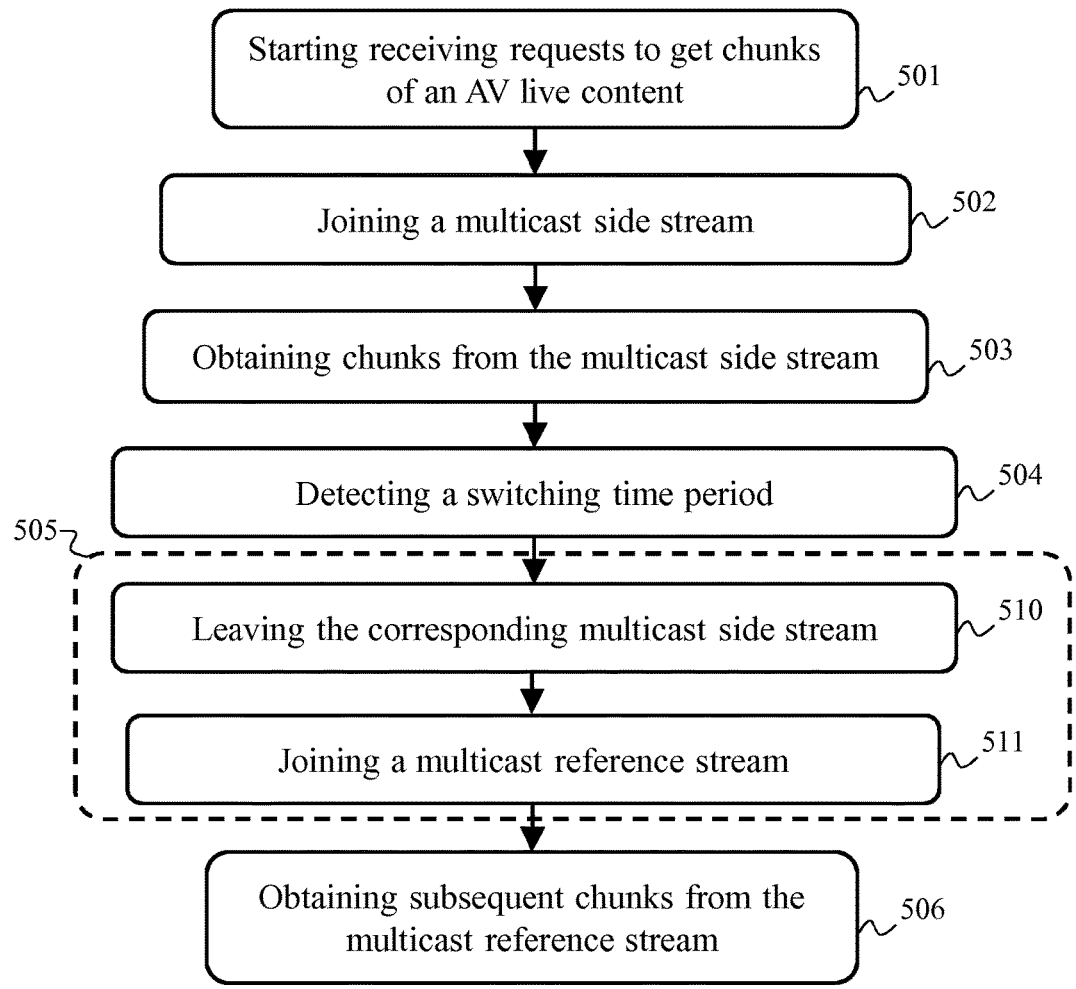
Figure 6:
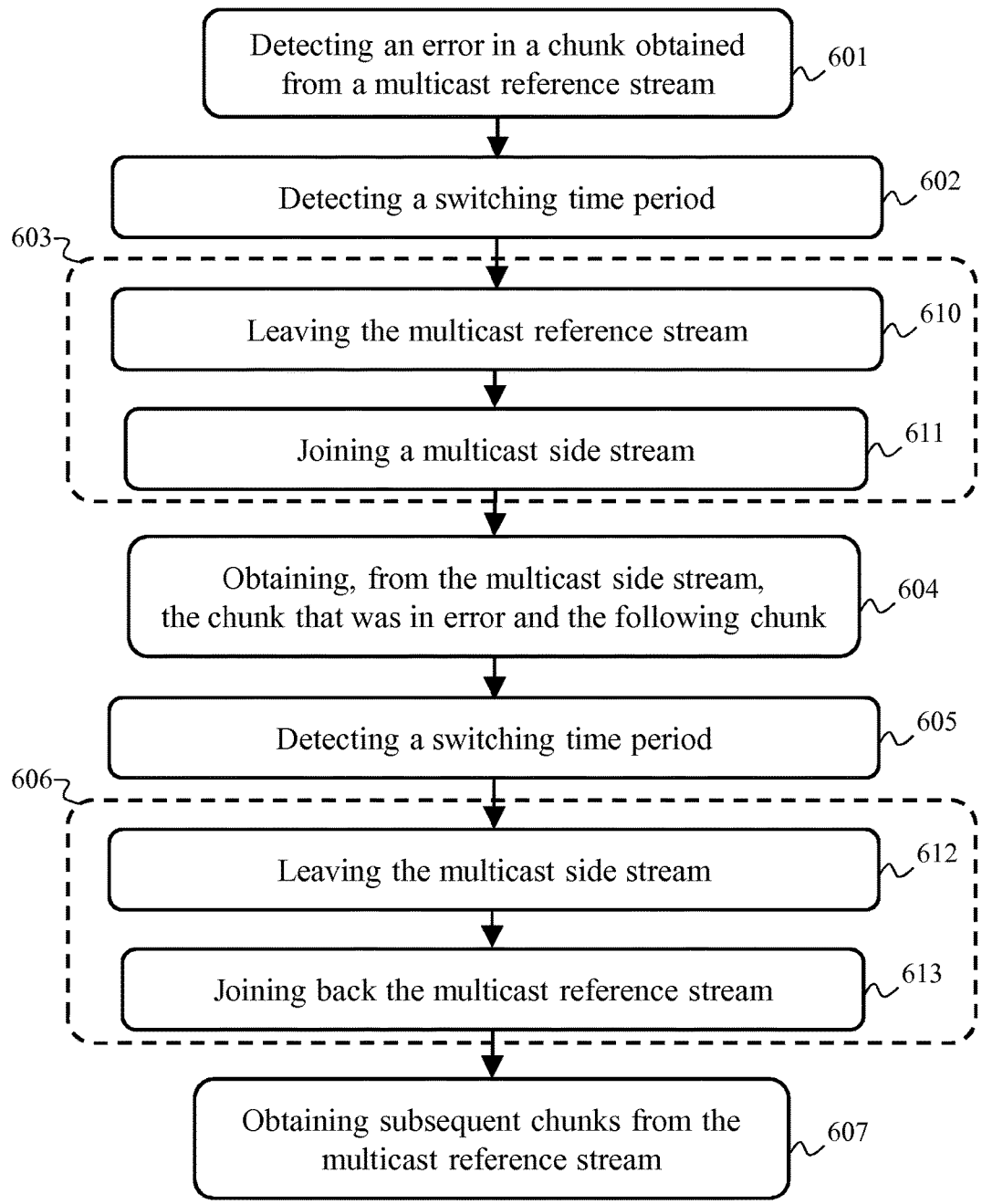

The characteristics of the invention will emerge more clearly from a reading of the following description of an example of embodiment, said description being produced with reference to the accompanying drawings, among which:

FIG. 1 schematically represents a communication system in which the present invention may be implemented;

FIG. 2 schematically represents an architecture of at least one network interconnecting device of the communication system of FIG. 1 and/or of a server device of the communication system of FIG. 1;

FIG. 3A schematically represents an algorithm, performed by the server device, for AV live content delivery, according to a first embodiment of the present invention;

FIG. 3B schematically represents an algorithm, performed by the server device, for AV live content delivery, according to a second embodiment of the present invention;

FIG. 4A schematically represents an example of streams, as synchronously transmitted by the server device, according to the first embodiment of the present invention;

FIG. 4B schematically represents another example of streams, as synchronously transmitted by the server device, according to the second embodiment of the present invention;

FIG. 4C schematically represents yet another example of streams, as synchronously transmitted by the server device, according to the second embodiment of the present invention;

FIG. 5 schematically represents an algorithm, performed by said at least one network interconnecting device, for AV live content delivery, according to an embodiment of the present invention; and FIG. 6 schematically represents an algorithm, performed by said at least one network interconnecting device, for recovering errors during AV live content delivery, according to an embodiment of the present invention.

DETAILED DESCRIPTION OF AT LEAST ONE EMBODIMENT

In order to improve QoE when delivering an AV live content, it is proposed that a server device generates and transmits at least one reference multicast stream along transmission periods, one chunk of the AV live content being transported per transmission period by each reference multicast stream, and that the server device generates and transmits at least one multicast side stream, each multicast side stream being synchronously transmitted by the server device with each reference multicast stream, each multicast side stream including per transmission period the same chunk as each multicast reference stream as well as at least one preceding chunk.

Thus, by joining first one multicast side stream and then switching to one reference multicast stream, a client device buffer is more rapidly filled in and playing the AV live content can start more rapidly, considering that a minimum quantity of chunks has to be buffered before being able to play the AV live content. QoE is therefore improved in such a startup context.

Moreover, by joining one multicast side stream when an error is detected in a chunk obtained from one multicast reference stream, the chunk in error can be retrieved and a client device can receive the chunk without error. QoE is therefore improved in such an error recovery context.

An embodiment of the present invention is detailed hereafter with regard to a network interconnecting device, such as a residential gateway, acting as a relay between a client device willing to play an AV live content and a server device providing the AV live content in the form of multicast streams. More particularly, the embodiment of the present invention detailed hereafter considers that the network interconnecting device converts multicast data received from the server device into unicast data addressed to the client device in order to fulfill unicast requests transmitted by the client device for obtaining the AV live content. The network interconnecting device is therefore considered as a device willing to receive the audio-video live content (on behalf of the client device). The principles described hereinafter can also be applied in a broader context in which the device willing to receive the AV live content is able to directly receive the multicast streams from the server device, for instance when the client device is integrated in a residential gateway, or for instance when the client is integrated in an OTT ("Over-The-Top") STB ("Set-Top Box") adapted to process multicast streams or integrated in a connected TV ("Television") set adapted to process multicast streams.

FIG. 1 schematically represents a communication system in which the present invention may be implemented.

The communication system comprises a first network interconnecting device 101a adapted to interconnect a first network 110a to which at least one client device 111 is connected and a second network 120 to which a server device 121 is directly or indirectly connected. The communication system further comprises a second network interconnecting device 101b adapted to interconnect a third network 110b to which at least one client device 112, 113 is connected and the second network 120 to which the server device 121 is directly or indirectly connected. The communication system may comprise more such network interconnecting devices adapted to interconnect respective networks to which at least one client device is connected and the second network 120.

In a preferred embodiment, each such network interconnecting device is a residential gateway interconnecting a local area network LAN to which at least one client device is connected and a wide area network WAN, such as the Internet, to which the server 121 is directly or indirectly connected.

The communication system further comprises the server device 121. The server device 121 is adapted to provide, in a multicast way, at least one AV live content intended to be played by at least one client device, and in normal operation, by a plurality of client devices via respective network interconnecting devices. The network interconnecting devices are adapted to manage registration operations in order to receive data transported by the multicast streams provided by the server device 121 and the network interconnecting devices are adapted to relay said data toward at least one client device that is willing to play the AV live content. Relying on multicast transmissions via the second network 120 allows downsizing the back-end infrastructure (i.e. the processing resources and bandwidth needed by the server device 121) compared to a delivery of the AV live content in a unicast way.

According to a particular embodiment, the server device 121 is adapted to deliver via the second network 120 at least one AV live content in the form of multicast streams using RTP over UDP ("User Datagram Protocol", as defined by the normative document RFC 768).

Client devices therefore get access to at least one AV live content provided by the server device 121 via respective network interconnecting devices. According to the illustrative example of communication system shown in FIG. 1, the client device 111 is adapted to get access to each AV live content provided by the server device 121 via the network interconnecting device 101a, and the client devices 112, 113 are adapted to get access to each AV live content provided by the server device 121 via the network interconnecting device 101b.

In a preferred embodiment, the client devices are adapted to request chunks of the AV live content in a unicast way, using HTTP. Resulting requests are interpreted by the respective network interconnecting devices to which the considered client devices are connected, and said network interconnecting devices are adapted to convert data received in a multicast way from the server device 121 into data transmitted in a unicast way to the concerned respective client devices.

In the preferred embodiment, the client devices 111, 112, 113 support ABS and the server device 121 is adapted to provide the AV live content in different alternate versions containing the same material encoded at various respective bitrates, i.e. respective resolutions. Each client device 111, 112, 113 is therefore adapted to select the version of the AV live content matching available network resources and/or available processing resources of said client device.

As detailed hereafter with regard to FIGS. 3A and 3B, the server device 121 is adapted to generate at least one multicast reference stream and at least one multicast side stream, and is further adapted to synchronously transmit the generated multicast streams. Considering that time is divided into successive transmission periods, the server device 121 is adapted to transmit one frame of each multicast reference stream in each transmission period, one chunk of the AV live content being transmitted in each frame of each multicast reference stream.

Each transmission period equals the duration of a time period needed by a client device to play one chunk of the AV live content. When plural versions of the AV live content exist, each multicast reference stream transports chunks in a respective version of the AV live content, i.e. the multicast reference streams transport chunks of the AV live content in different respective resolutions.

The server device 121 is adapted to transmit one frame of each multicast side stream in each transmission period, a plurality of chunks of the AV live content being transmitted in each frame of each multicast side stream. Said plurality of chunks is such that, per transmission period, the frame of each multicast side stream includes the same chunk of the AV live content as in each multicast reference stream, as well as at least one preceding chunk of the AV live content. When plural multicast side streams are generated, each multicast side stream transports chunks in a respective version of the AV live content, i.e. the multicast side streams transport chunks of the AV live content in different respective resolutions. Examples of such multicast streams are detailed hereafter with regard to FIGS. 4A, 4B and 4C.

In order to improve QoE, each concerned network interconnecting device adequately manages registration to the multicast streams provided by the server device 121. This aspect is detailed hereafter with regard to FIG. 5.

FIG. 2 schematically represents an architecture of a network interconnecting device 101 of the communication system and/or of the server device 121. The network interconnecting device 101 can be any network interconnecting device of the communication system which act as a relay between the server device 121 and at least one client device, such as the first network interconnecting device 101a or the second network interconnecting device 101b.

According to the shown architecture, the network interconnecting device 101 comprises the following components interconnected by a communications bus 210: a processor, microprocessor, microcontroller or CPU ("Central Processing Unit") 200; a RAM ("Random-Access Memory") 201; a ROM ("Read-Only Memory") 202; a HDD ("Hard-Disk Drive") 203, or any other device adapted to read information stored on storage means; a first communication interface 204 and a second communication interface 205.

The first communication interface 204 enables the network interconnecting device 101 to be connected to a communication network to which at least one client device is connected, and the second communication interface 205 enables the network interconnecting device 101 to be connected to another communication network to which the server device 121 is directly or indirectly connected. The first 204 and second 205 communication interfaces are such that the network interconnecting device 101 is able to act as a relay between each said client device and the server device 121.

It should be noted that, considering the server device 121, only one communication interface may be implemented, for connecting the server device 121 to the second network 120.

CPU 200 is capable of executing instructions loaded into RAM 201 from ROM 202 or from an external memory, such as HDD 203. After the network interconnecting device 101 has been powered on, CPU 200 is capable of reading instructions from RAM 201 and executing these instructions. The instructions form one computer program that causes CPU 200 to perform the steps performed by the network interconnecting device 101 as described hereafter with regard to FIG. 5.

When the shown architecture represents the implementation of the server device 121, after the server device 121 has been powered on, CPU 200 is capable of reading instructions from RAM 201 and executing these instructions. The instructions form one computer program that causes CPU 200 to perform the steps performed by the server device 121 as described hereafter with regard to FIGS. 3A and 3B.

It should be noted that the steps and algorithms described hereinafter may be implemented in software by execution of a set of instructions or program by a programmable computing machine, such as a PC, a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

FIG. 3A schematically represents an algorithm, performed by the server device 121, for AV live content delivery, according to a first embodiment of the present invention.

In a step 301, the server device 121 obtains an AV live content to be provided via the second network 120 in a multicast way. The server device 121 then obtains or forms a multicast stream of chunks of the obtained AV live content. The form of the multicast stream is such that one chunk of the AV live content is provided per frame of the multicast stream. Considering that time is divided into successive transmission periods, the server device 121 intends to transmit one frame of the multicast reference stream in each transmission period, i.e. one chunk per transmission period.

In a step 302, the server device 121 obtains a multicast side stream for the AV live content. The form of the multicast side stream is such that a plurality of M chunks of the AV live content is provided per frame of the multicast side stream, preferably such that M≥N, i.e. M chunks per transmission period. It is reminded that N represents the quantity of chunks needed by a client device to fill in a buffer before starting playing the AV live content. N, and therefore M, are typically predefined according to specifications of the communication system. In the preferred embodiment, M=N. According to one example, M=N=3.

It can be noted that the steps 301 and 302 may be performed in a different sequence order or in parallel.

In a step 303, the server device 121 transmits the multicast reference stream, obtained in the step 301, according to a first bitrate allowing to transmit one frame of the multicast reference stream per transmission period. The server device 121 transmits the multicast side stream, obtained in the step 302, according to a second bitrate allowing to transmit one frame of the multicast side stream per transmission period. Preferably, the first and second bitrates are adapted such that the transmission of one frame of the multicast reference stream substantially equals in duration the transmission of one frame of the multicast side stream in the same transmission period. In terms of chunks, the second bitrate is such that the server device 121 is able to transmit M times more chunks per transmission period in the multicast side stream than in the multicast reference stream.

The server device 121 transmits both streams synchronously in a multicast way. In other words, the server device 121 starts transmitting substantially at a same instant one frame of the multicast reference stream and one frame of the multicast side, wherein, per transmission period, the frame of the multicast side stream contains the same chunk as in the frame of the multicast reference stream, as well as at least one preceding chunk (a quantity of M−1 preceding chunks). In other words, the chunks contained in a frame of the multicast side stream transmitted in a considered transmission period are: the chunk transmitted in the multicast reference stream in said considered transmission period, as well as each chunk transmitted in the multicast reference stream in the M−1 transmission periods immediately preceding said considered transmission period.

The chunks of each frame of the multicast side stream may be arranged in increasing sequence order, i.e. considering that a chunk identified by a sequence number C is transmitted in a frame of the multicast reference stream, the frame of the multicast side stream transmitted in the same transmission period contains first the chunk identified by the sequence number C−2, then followed by a chunk identified by the sequence number C−1 and finally followed by a chunk identified by the sequence number C.

In the preferred embodiment, the chunks of each frame of the multicast side stream are arranged in decreasing sequence order, i.e. considering that a chunk identified by a sequence number C is transmitted in a frame of the multicast reference stream, the frame of the multicast side stream transmitted in the same transmission period contains first the chunk identified by the sequence number C, then followed by a chunk identified by the sequence number C−1 and finally followed by a chunk identified by the sequence number C−2. Such an arrangement provides an even more faster access to the AV live content from the standpoint of the client devices.

During transmission, the server device 121 preferably maintains a gap between successive frames of the multicast reference stream and between successive frames of the multicast side stream, in order to ease switching in between multicast streams. The duration of such gaps is such that it enables, in the meantime, leaving a multicast stream provided by the server 121 and joining another multicast stream also provided by the server 121. In the preferred embodiment, such gaps are performed by transmitting empty frames (also referred to as dummy frames).

An illustrative example of such transmission of multicast streams is detailed hereafter with regard to FIG. 4A.

In a particular embodiment, the multicast reference streams are formed such that each frame includes information representative of a position inside the AV live content. Such information may be representative of at least the following chunk of the AV live content, i.e. at least the chunk transported by the multicast reference stream in the next transmission period. Such information may be representative of the lastly transmitted chunk and potentially of preceding chunks, i.e. at least the chunk transported by the multicast reference stream in the same transmission period when such information terminates the frame. Said information may be a timestamp or a sequence position reference. Said information may further depend on the resolution of the concerned following chunk(s).

When the AV live content is in a form compliant with HLS, each frame of the multicast reference stream includes, and is preferably terminated, by a playlist in the HLS format and representative of a position inside the AV live content. This playlist is copied inside the frame, and preferably at the end of the frame, of the multicast side stream in the same transmission period.

When the AV live content is in a form compliant with Smooth Streaming, each frame of the multicast reference stream includes timestamp information in the Smooth Streaming format and representative of a position inside the AV live content. Such information is preferably copied inside the frame of the multicast side stream in the same transmission period.

A similar approach can be applied when the AV live content is in a form compliant with another streaming technology, such as DASH or HDS.

FIG. 4A schematically represents an example of multicast streams, as synchronously transmitted by the server device 121, according to the first embodiment of the present invention.

According to said example, the server device 121 transmits frames of a multicast reference stream 400, each frame containing one chunk 401 of the AV live content. The frames of the multicast reference stream 400 are transmitted by the server device 121 at a first bitrate such that one frame of the multicast reference stream 400 is transmitted per transmission period, i.e. one chunk per transmission period. Four transmission periods TP1, TP2, TP3 and TP4 are represented in FIG. 4A.

Furthermore, according to said example, the server device 121 transmits frames of a multicast side stream 410, each frame of the multicast side stream 410 containing a plurality of M=3 chunks 411, 412, 413 of the AV live content. The frames of the multicast side stream 410 are transmitted by the server device 121 at a second bitrate such that one frame of the multicast side stream 410 is transmitted per transmission period, i.e. M=3 chunks per transmission period.

As schematically represented in doted lines, the server device 121 synchronously transmits the frames of the multicast reference stream 400 and the frames of the multicast side stream 410, in such a way that each frame of the multicast side stream 410 contains the same chunk of the AV live content as in the frame of the multicast reference stream 400 transmitted during the same transmission period, as well as at least one preceding chunk.

Considering illustratively that each frame of the multicast side stream 410 contains M=3 chunks, each frame of the multicast side stream 410 contains the same chunk as in the frame of the multicast reference stream 400 transmitted in the same transmission period, as well as the two immediately preceding chunks. For instance, when the frame of the multicast reference stream 400 in the transmission period TP3 includes a chunk having a sequence number C, the frame of the multicast side stream 410 in the transmission period TP3 includes the chunk having the sequence number C, as well as another chunk having the sequence number C−1 (namely, the chunk transmitted in a frame of the multicast reference stream 400 in the transmission period TP2) and yet another chunk having the sequence number C−2 (namely, the chunk transmitted in a frame of the multicast reference stream 400 in the transmission period TP1).

As shown in FIG. 4A, the server device 121 maintains a gap between successive frames of the multicast stream 400 and between successive frames of the multicast side stream 410. Said gaps enable switching from the multicast side stream 410 to the multicast reference stream 400 in the meantime (i.e. leaving the multicast side stream 410, then joining the multicast reference stream 400), or vice versa.

It can be noted that the multicast reference stream 400 and the multicast side stream 410 may transport chunks of the same resolution. Therefore, switching in between said multicast streams has no impact from the standpoint of the client device. In a variant embodiment, the multicast side stream 410 transports chunks having a lower resolution than the chunks transported by the multicast reference stream 400, and preferably the multicast side stream 410 transport chunks having a resolution that equals the resolution, of the chunks transported by the multicast reference stream 400, divided by M (i.e. the quantity of chunks per frame in the multicast side stream 410).

In a particular embodiment, the AV live content is in a form compliant with HLS and each frame of the multicast reference stream 400 includes, and is preferably terminated by, a playlist 402 in the HLS format. For each transmission period, the playlist 402 is then copied inside the frame, and preferably at the end of the frame, of the multicast side stream 410 in order to form a playlist 414. Such a playlist is used to identify a position within the AV live content.

In another particular embodiment, the AV live content is in a form compliant with Smooth Streaming and each frame of the multicast reference stream 400 includes timestamp information in the Smooth Streaming format. For each transmission period, said timestamp information is then copied inside the frame of the multicast side stream 410. Such timestamp information is used to identify a position within the AV live content.

FIG. 3B schematically represents an algorithm, performed by the server device 121, for AV live content delivery, according to a second embodiment of the present invention.

In a step 351, the server device 121 obtains an AV live content to be provided via the second network 120 in a multicast way. The server device 121 then obtains or forms a plurality of multicast streams of chunks of the obtained AV live content. The form of the multicast streams is such that one chunk of the AV live content is provided per frame of each multicast stream. Considering that time is divided into successive transmission periods, the server device 121 intends to transmit one frame of each multicast reference stream in each transmission period, i.e. one chunk per transmission period.

Each multicast reference stream corresponds to a respective resolution of the AV live content, in order to allow client devices to benefit from ABS. It means that, even though two frames of two distinct multicast reference streams which are intended to be transmitted in a same transmission period contain the same chunk of the AV live content, the data representative of said chunk are different in the multicast reference streams, since said data correspond to distinct resolutions of the AV live content.

In a step 352, the server device 121 obtains at least one multicast side stream for the AV live content. The form of each multicast side stream is such that a plurality of M chunks of the AV live content is provided per frame of said multicast side stream, i.e. M chunks per transmission period.

It can be noted that the steps 351 and 352 may be performed in a different sequence order or in parallel.

In a step 353, the server device 121 transmits each multicast reference stream, obtained in the step 351, according to a respective first bitrate allowing to transmit one frame of said multicast reference stream per transmission period. The server device 121 transmits each multicast side stream, obtained in the step 302, according to a respective second bitrate allowing to transmit one frame of said multicast side stream per transmission period. Preferably, the first and second bitrates are adapted such that the transmission of one frame of any multicast reference stream substantially equals in duration the transmission of one frame of any multicast side stream in the same transmission period. In terms of chunks, the second bitrate is such that the server device 121 is able to transmit M times more chunks per transmission period in any multicast side stream than in any multicast reference stream.

The server device 121 transmits all streams synchronously in a multicast way. In other words, the server device 121 starts transmitting substantially at a same instant one frame for each multicast reference stream obtained in the step 351 and one frame for each multicast side stream obtained in the step 352, wherein, per transmission period, the frame of each multicast side stream contains the same chunk as in the frame of any multicast reference stream, as well as at least one preceding chunk (a quantity of M−1 preceding chunks). In other words, the chunks contained in a frame of any multicast side stream transmitted in a considered transmission period are: the chunk transmitted in any multicast reference stream in said considered transmission period, as well as each chunk transmitted in any multicast reference stream in the M−1 transmission periods immediately preceding said considered transmission period.

The chunks of each frame of the multicast side streams may be arranged in increasing sequence order, but are preferably arranged in decreasing sequence order.

During transmission, the server device 121 preferably maintains a gap between successive frames of each multicast reference stream obtained in the step 351 and between successive frames of each multicast side stream obtained in the step 352, in order to ease switching in between multicast streams. The duration of such gaps is such that it enables, in the meantime, leaving a multicast reference stream provided by the server 121 and joining another multicast stream also provided by the server 121. The duration of such gaps is also such that it enables, in the meantime, leaving a multicast side stream provided by the server 121 and joining any multicast reference stream also provided by the server 121, and vice versa. In the preferred embodiment, such gaps are performed by transmitting empty frames.

Two illustrative examples of such transmission of multicast streams are detailed hereafter with regard to FIGS. 4B and 4C.

In a particular embodiment, the multicast streams are formed such that each frame includes information representative of a position inside the AV live content.

When the AV live content is in a form compliant with HLS, each frame of each multicast reference stream includes, and is preferably terminated by, a playlist in the HLS format and representative of a position inside the AV live content. This playlist are preferably adequately copied inside the frame, and preferably at the end of the frame, of the multicast side stream(s) in the same transmission period, as presented hereafter with regard to FIGS. 4B and 4C.

When the AV live content is in a form compliant with Smooth Streaming, each frame of each multicast reference stream includes timestamp information in the Smooth Streaming format and representative of a position inside the AV live content. Such timestamp information is preferably adequately copied inside the frame of the multicast side stream(s) in the same transmission period, as presented hereafter with regard to FIGS. 4B and 4C.

A similar approach can be applied when the AV live content is in a form compliant with another streaming technology, such as DASH or HDS.

FIG. 4B schematically represents another example of multicast streams, as synchronously transmitted by the server device 121, according to the second embodiment of the present invention.

According to said example, the server device 121 transmits frames of the multicast stream 400. It is reminded that each said frame contains one chunk 401 of the AV live content, i.e. one chunk per transmission period.

According to said example, the server device 121 transmits frames of another multicast reference stream 420, the chunks transported by the multicast reference stream 420 having a resolution different (e.g. higher) than the chunks transported by the multicast reference stream 400. Here again, each said frame contains one chunk of the AV live content, i.e. one chunk per transmission period.

According to said example, the server device 121 further transmits frames of yet another multicast reference stream 440, the chunks transported by the multicast reference stream 440 having a resolution different (e.g. higher) than the chunks transported by the multicast reference stream 400 and than the chunks transported by the multicast reference stream 420. Here again, each said frame contains one chunk of the AV live content, i.e. one chunk per transmission period. The same chunk of the AV live content is thus intended to be transmitted per transmission period via the multicast reference streams 400, 420, 440, but in different resolutions. Three alternative versions of the AV live content in terms of resolution are thus made available to client devices.

The frames of the multicast reference stream 400 are transmitted by the server device 121 at a bitrate such that one frame of the multicast reference stream 400 is transmitted per transmission period. The four transmission periods TP1, TP2, TP3 and TP4 are represented in FIG. 4B too. The frames of the multicast reference stream 420 are transmitted by the server device 121 at a bitrate such that one frame of the multicast reference stream 420 is transmitted per transmission period. The frames of the multicast reference stream 440 are transmitted by the server device 121 at a bitrate such that one frame of the multicast reference stream 440 is transmitted per transmission period. Said bitrates are thus typically different since the data transported in the multicast reference streams 400, 420, 440 have different resolutions.

Furthermore, according to said example, the server device 121 transmits frames of the multicast side stream 410. It is reminded that each frame of the multicast side stream 410 contains a plurality of M chunks 411, 412, 413 of the AV live content. The frames of the multicast side stream 410 are transmitted by the server device 121 at a bitrate such that one frame of the multicast side stream 410 is transmitted per transmission period, i.e. M chunks per transmission period.

As schematically represented in doted lines, the server device 121 synchronously transmits the frames of the multicast reference streams 400, 420, 440 and the frames of the multicast side stream 410, in such a way that each frame of the multicast side stream 410 contains the same chunk as in the frame of any multicast reference stream 400, 420, 440 transmitted in the same transmission period, as well as at least one preceding chunk.

Considering illustratively that each frame of the multicast side stream 410 contains M=3 chunks, each frame of the multicast side stream 410 contains the same chunk as in the frame of any one of the multicast reference streams 400, 420, 440 transmitted in the same transmission period, as well as the two immediately preceding chunks. For instance, when the frame of the multicast reference stream 400 in the transmission period TP3 includes a chunk having a sequence number C:

- the frame of the multicast reference stream 420 includes the chunk having the sequence number C, but in another resolution;
- the frame of the multicast reference stream 440 includes the chunk having the sequence number C, but in yet another resolution; and
- the frame of the multicast side stream 410 in the transmission period TP3 includes the chunk having a sequence number C, as well as another chunk having the sequence number C−1 (namely, the chunk transmitted in a frame of the multicast reference stream 400 in the transmission period TP2) and yet another chunk having the sequence number C−2 (namely, the chunk transmitted in a frame of the multicast reference stream 400 in the transmission period TP1).

As shown in FIG. 4B, the server device 121 maintains a gap between successive frames of the multicast reference stream 400, between successive frames of the multicast reference stream 420, between successive frames of the multicast reference stream 440 and between successive frames of the multicast side stream 410. Said gaps enable switching from the multicast side stream 410 to any one of the multicast reference streams 400, 420, 440 in the meantime (i.e. leaving the multicast side stream 410, then joining any one of the multicast reference streams 400, 420, 440), or vice versa. Said gaps further enable switching from any one of the multicast reference streams 400, 420, 440 to any other one of the multicast reference streams 400, 420, 440 in the meantime.

It can be noted that the multicast side stream 410 may transport chunks of the lowest resolution among the resolutions available via the multicast reference streams 400, 420, 440. In a variant embodiment, the multicast side stream 410 may transport chunks of any resolution among the resolutions available via the multicast reference streams 400, 420, 440. In another variant embodiment, the multicast side stream 410 may transport chunks having a resolution lower than any resolution available via the multicast reference streams 400, 420, 440.

In a particular embodiment, the AV live content is in a form compliant with HLS and each frame of each multicast reference stream 400, 420, 440 includes, and is preferably terminated by, respective playlists in the HLS format and representative of a position inside the AV live content. Each said playlist depends on the resolution of the multicast reference stream in which said playlist is present. For each transmission period, the playlists of all multicast reference streams 400, 420, 440 are then copied inside the frame, and preferably at the end of the frame, of the multicast side stream 410 in order to form an aggregated playlist. When the client devices obtain the AV live content via respective network interconnecting devices converting multicast data into unicast data, such playlists are used by the client devices to appropriately further form unicast requests to get the following chunks of the AV live content. The unicast requests are then resolution-dependent, even though the concerned network interconnecting device skips such constraint when providing a chunk received via the multicast side stream 410.

In another particular embodiment, the AV live content is in a form compliant with Smooth Streaming and each frame of each multicast reference stream 400, 420, 440 includes respective timestamp information in the Smooth Streaming format and representative of a position inside the AV live content. Said timestamp information does not depend on the resolution of the multicast reference stream in which said timestamp information is present. For each transmission period, the timestamp of any multicast reference stream 400, 420, 440 is then copied inside the frame of the multicast side stream 410. When the client devices obtain the AV live content via respective network interconnecting devices converting multicast data into unicast data, such timestamp information is used by the client devices to appropriately further form unicast requests to get the following chunks of the AV live content.

FIG. 4C schematically represents yet another example of streams, as synchronously transmitted by the server device 121, according to the second embodiment of the present invention.

According to said example, the server device 121 transmits frames of the multicast reference stream 400, as well as frames of the multicast reference stream 420 and frames of the multicast reference stream 440, as already detailed with regard to FIG. 4B. Thus, as in the example illustratively shown in FIG. 4B, three alternative versions of the AV live content in terms of resolution are thus made available to client devices.

Furthermore, according to said example, the server device 121 transmits frames of the multicast side stream 410. The multicast side stream 410 transports chunks having the same resolution as the chunks transported by the multicast reference stream 400. It is reminded that each frame of the multicast side stream 410 contains a plurality of M chunks 411, 412, 413 of the AV live content, as already explained.

The server device 121 further transmits frames of another multicast side stream 430. The multicast side stream 430 transports chunks having the same resolution as the chunks transported by the multicast reference stream 420. The frames of the multicast side stream 430 have the same format, and are similarly built, as the frames of the multicast side stream 410, but contain chunks having a different resolution than the chunks contained in the multicast side stream 410. The frames of the multicast side stream 430 are transmitted by the server device 121 at a bitrate such that one frame of the multicast side stream 430 is transmitted per transmission period. The four transmission periods TP1, TP2, TP3 and TP4 are represented in FIG. 4C too.

The server device 121 further transmits frames of yet another multicast side stream 450. The multicast side stream 450 transports chunks having the same resolution as the chunks transported by the multicast reference stream 440. The frames of the multicast side stream 450 have the same format, and are similarly built, as the frames of the multicast side stream 410 and of the multicast side stream 430, but contain chunks having a different resolution than the chunks contained in the multicast side stream 410 and than the chunks contained in the multicast side stream 430. The frames of the multicast side stream 450 are transmitted by the server device 121 at a bitrate such that one frame of the multicast side stream 430 is transmitted per transmission period.

Considering illustratively that each frame of any one of the multicast side streams 410, 430, 450 contains M=3 chunks, each frame of said multicast side stream contains the same chunk as in the frame of any one of the multicast reference streams 400, 420, 440 transmitted in the same transmission period, as well as the two immediately preceding chunks. For instance, when the frame of the multicast reference stream 400 in the transmission period TP3 includes a chunk having a sequence number C:
  the frame of the multicast reference stream 420 includes the chunk having the sequence number C, but in another resolution;
  the frame of the multicast reference stream 440 includes the chunk having the sequence number C, but in yet another resolution;
  the frame of the multicast side stream 410 in the transmission period TP3 includes the chunk having a sequence number C, as well as another chunk having the sequence number C−1 (namely, the chunk transmitted in a frame of the multicast reference stream 400 in the transmission period TP2) and yet another chunk having the sequence number C−2 (namely, the chunk transmitted in a frame of the multicast reference stream 400 in the transmission period TP1), with a resolution identical as the chunk transported in the multicast reference stream 400;
  the frame of the multicast side stream 430 in the transmission period TP3 includes the chunk having the sequence number C, as well as said another chunk having the sequence number C−1 and said yet another chunk having the sequence number C−2, with a resolution identical as the chunk transported in the multicast reference stream 420; and
  the frame of the multicast side stream 450 in the transmission period TP3 includes the chunk having the sequence number C, as well as said another chunk having the sequence number C−1 and said yet another chunk having the sequence number C−2, with a resolution identical as the chunk transported in the multicast reference stream 440.

As shown in FIG. 4C, the server device 121 maintains a gap between successive frames of the multicast reference stream 400, between successive frames of the multicast reference stream 420, between successive frames of the multicast reference stream 440, between successive frames of the multicast side stream 410, between successive frames of the multicast side stream 430 and between successive frames of the multicast side stream 450. Said gaps enable switching, in the meantime, from the multicast side stream 410 to the multicast reference stream 400, or from the multicast side stream 430 to the multicast reference stream 420, or from the multicast side stream 450 to the multicast reference stream 440, or vice versa.

In a particular embodiment, the AV live content is in a form compliant with HLS and each frame of each multicast reference stream 400, 420, 440 is terminated by respective playlists in the HLS format and representative of a position inside the AV live content. Each said playlist depends on the resolution of the multicast reference stream in which said playlist is present. For each transmission period, the playlist of each multicast reference stream 400, 420, 440 is then copied at the end of the frame of the multicast side stream 410, 430, 450 that corresponds to the same resolution. When the client devices obtain the AV live content via respective network interconnecting devices converting multicast data into unicast data, such playlists are used by the client devices to appropriately further form unicast requests to get the following chunks of the AV live content in a specified resolution. The unicast requests are then resolution-dependent.

In another particular embodiment, the AV live content is in a form compliant with Smooth Streaming and each frame of each multicast reference stream 400, 420, 440 includes respective timestamp information in the Smooth Streaming format and representative of a position inside the AV live content. For each transmission period, the timestamp of each multicast reference stream 400, 420, 440 is then copied inside the frame of the multicast side stream 410, 430, 450 that corresponds to the same resolution. When the client devices obtain the AV live content via respective network interconnecting devices converting multicast data into unicast data, such timestamp information is used by the client devices to appropriately further form unicast requests to get the following chunks of the AV live content.

FIG. 5 schematically represents an algorithm, performed by the network interconnecting device 101, for AV content delivery, according to an embodiment of the present invention. It is considered in the scope of the algorithm of FIG. 5 that the server device 121 generates multicast streams, as already described with regard to FIG. 3A or 3B.

In a step 501, the network interconnecting device 101 starts receiving requests to get chunks of an AV live content. Said requests are originated by a client device for which the network interconnecting device 101 acts as a relay to obtain said chunks from the server device 121. Said requests are preferably transmitted within a unicast connection and shall therefore be responded within said unicast connection. It means that the network interconnecting device 101 is adapted to convert data received in a multicast way from the server device 121 into data to be transmitted in a unicast way to the client device.

Typically, the network interconnecting device 101 quotes the chunks of the AV live content from the server device 121 via at least one multicast reference stream and at least one multicast side stream. The network interconnecting device 101 preferably listens to only one multicast stream containing chunks of the AV live content at a time. It allows limiting the processing resources and bandwidth needed by the network interconnecting device 101 to act as a relay between the server device 121 and the client device. The chunks received from the server device 121 are stored in a buffer of the network interconnecting device 101, and said chunks are provided (i.e. output from said buffer) in sequence to the client device upon receiving requests from the client device.

In a step 502, the network interconnecting device 101 starts accessing the audio-video live content and joins a multicast side stream including chunks of the AV live content which is provided by the server device 121. Considering the respective examples shown in FIGS. 4A and 4B, the network interconnecting device 101 joins the multicast side stream 410. Considering the example shown in FIG. 4C, the network interconnecting device 101 obtains first an indication of which resolution is concerned by the requests received in the step 501, and then joins either the multicast side stream 410 or the multicast side stream 430 or the multicast side stream 450, according said resolution.

In a step 503, the network interconnecting device 101 obtains chunks from the joined multicast side stream. The obtained chunks are buffered by the network interconnecting device 101 for further transmission to the client device. Since each multicast side stream transmitted by the server device 121 contains a plurality of chunks, and more particularly the same chunk as in the multicast reference streams for the same transmission period as well as at least one preceding chunk, the client device is able to fill in more rapidly its internal buffer used to enable playing the AV live content.

For instance, during the transmission period at which the network interconnecting device 101 has joined the multicast side stream, and considering that each multicast reference stream relative to the AV live content transports a chunk with sequence number C in said transmission period, the interconnecting device 101 is potentially able to obtain chunks with the sequence numbers C, C−1 and C−2. It allows obtaining more chunks than by simply joining a multicast reference stream relative to the AV live content.

The network interconnecting device 101 may join the multicast side stream in the middle of a frame. Each frame is preferably transported using one or more UDP datagrams. Each UDP datagram payload comprises a header indicating whether following data in the UDP datagram payload corresponds to a new chunk or another part of a chunk that was started to be transmitted in a preceding UDP datagram. When considering a multicast side stream according to the present invention, the chunks of a single transmission period are transported by distinct UDP datagrams. When joining a multicast steam, UDP datagrams payload is discarded until reaching a header indicating that the following data in the UDP datagram payload corresponds to a new chunk.

In a step 504, the network interconnecting device 101 detects a switching time period, i.e. the gap between successive frames of the multicast side stream. When the gap is performed by transmitting empty frames, the network interconnecting device 101 detects that at least one said empty frame is received. It allows easily detecting said gap. The network interconnecting device 101 may, in a variant embodiment, detect said gap by maintaining a local view of the transmission periods and estimate the location of said gaps within said transmission periods.

The network interconnecting device 101 considers that a detected gap corresponds to an appropriate switching time period to switch from the multicast side stream to a multicast reference stream, when the network interconnecting device 101 has obtained from the multicast side stream the same chunk as lastly transmitted via the multicast reference stream, as well as at least the immediately preceding chunk.

For instance, when during a transmission period each multicast reference stream transports a chunk with sequence number C, the interconnecting device 101 considers that the next gap is an appropriate switching time period when the interconnecting device 101 succeeded in obtaining the chunks with the sequence numbers C and C−1 from the multicast side stream.

In a step 505, the network interconnecting device 101 switches, during the switching time period, to a multicast reference stream relative to the AV live stream. Considering the example shown in FIG. 4A, the network interconnecting device 101 switches from the multicast side stream 410 to the multicast reference stream 400 (since there is no other multicast reference stream relative to the AV live content). Considering the example shown in FIG. 4B, the network interconnecting device 101 obtains first an indication of which resolution is concerned by the requests received in the step 501, and then switches from the multicast side stream 410 to either the multicast reference stream 400, or the multicast reference stream 420, or the multicast reference stream 440, according said resolution. Considering the example shown in FIG. 4C, the network interconnecting device 101 either switches from the multicast side stream 410 to the multicast reference stream 400 (since they both transport chunks having the same resolution), or switches from the multicast side stream 430 to the multicast reference stream 420 (since they both transport chunks having the same resolution), or switches from the multicast side stream 450 to the multicast reference stream 440 (since they both transport chunks having the same resolution).

As shown in FIG. 5, the network interconnecting device 101 preferably performs such a switching operation by leaving the multicast side stream in a step S510 and by joining the multicast reference stream in a step S511.

In a step 506, the network interconnecting device 101 obtains subsequent chunks from the multicast reference stream to which the network interconnecting device 101 has switched in the step 505. Said subsequent chunks are buffered by the network interconnecting device 101 for further transmission to the client device.

The use of multicast side streams as described above therefore enables achieving low latency startup for playing the AV live content from the standpoint of the client devices, without oversizing the back-end infrastructure (i.e. the server device 121) to compensate potential concurrent accesses to the AV live content. The same principles may however apply in a context of recovering lost data, as detailed hereafter with regard to FIG. 6.

FIG. 6 schematically represents an algorithm, performed by the network interconnecting device 101, for recovering errors during AV live content delivery, according to an embodiment of the present invention. It is considered in the scope of the algorithm of FIG. 6 that the server device 121 generates multicast streams, as already described with regard to FIG. 3A or 3B. It is considered in the scope of the algorithm of FIG. 6 that the network interconnecting device 101 relays chunks of an AV live content as received via a multicast reference stream provided by the server device 121.

In a step 601, the network interconnecting device 101 detects an error in a chunk received via the multicast reference stream. For instance, at least part of said chunk is missing or is corrupted.

In a step 602, the network interconnecting device 101 detects a switching time period, i.e. the gap between successive frames of the multicast reference stream. When the gap is performed by transmitting empty frames, the network interconnecting device 101 detects that at least one said empty frame is received. It allows easily detecting said gap. The network interconnecting device 101 may, in a variant embodiment, detect said gap by maintaining a local view of the transmission periods and estimate the location of said gaps within said transmission periods.

The network interconnecting device 101 considers that a detected gap corresponds to an appropriate switching time period to switch from the multicast reference stream to a multicast side stream, when, during the next transmission period, said multicast side stream is expected to contain the chunk in error.

In a step 603, the network interconnecting device 101 switches, during the switching time period, to a multicast side stream relative to the AV live stream. Considering the example shown in FIG. 4A, the network interconnecting device 101 switches from the multicast reference stream 400 to the multicast side stream 410 (since there is no other multicast side stream relative to the AV live content). Considering the example shown in FIG. 4B, the network interconnecting device 101 switches from the multicast reference stream 400, or from the multicast reference stream 420, or from the multicast reference stream 440, to the multicast side stream 410 (since there is no other multicast side stream relative to the AV live content). Considering the example shown in FIG. 4C, the network interconnecting device 101 either switches from multicast reference stream 400 to the multicast side stream 410 (since they both transport chunks having the same resolution), or switches from the multicast reference stream 420 to the multicast side stream 430 (since they both transport chunks having the same resolution), or switches from the multicast reference stream 440 to the multicast side stream 450 (since they both transport chunks having the same resolution).

In a variant, the network interconnecting device 101 decides switching to the concerned multicast side stream as soon as an error is detected in a chunk, in such a way that the switching operation occurs before the end of the transmission period in which the chunk is transmitted in the multicast reference stream. The network interconnecting device 101 may therefore have the opportunity to obtain from the concerned multicast side stream the chunk that was detected in error before the end of said transmission period and be able to switch back to the multicast reference stream before the next transmission period starts.

As shown in FIG. 6, the network interconnecting device 101 preferably performs such a switching operation by leaving the multicast reference stream in a step S610 and by joining the multicast side stream in a step S611.

In a step 604, the network interconnecting device 101 obtains from the multicast side stream the chunk in error, i.e. the chunk for which an error has been detected in the step 601, as well as the chunk that is also transmitted in the same transmission period via the multicast reference stream. When the network interconnecting device 101 detects the error during the same transmission period as the chunk in error is transmitted, then only these two chunks need to be obtained from the multicast side stream. When the network interconnecting device 101 detects the error during another transmission period than the one in which the chunk in error is transmitted, then these two chunks need to be obtained from the multicast side stream, as well as any chunk that exist in between.

Let's consider, as a first example, that a chunk with sequence number C is detected as erroneous in the step 601. Let's further consider that the error is detected during the transmission period of the chunk with sequence number C. The network interconnecting device 101 switches to the multicast side stream for the next transmission period, in which the chunk with the sequence number C+1 is transmitted via the multicast reference stream. The network interconnecting device 101 therefore obtains, from the multicast side stream, the chunk with the sequence number C and the chunk with the sequence number C+1. Then, for the next transmission period, the network interconnecting device 101 can switch back to the multicast reference stream. Said chunks are buffered by the network interconnecting device 101 for further transmission to the client device.

Let's consider, as a second example, that a chunk with sequence number C is detected as erroneous in the step 601. Let's further consider that the error is detected during the transmission period of the chunk with sequence number C+1. The network interconnecting device 101 switches to the multicast side stream for the next transmission period, in which the chunk with the sequence number C+2 is transmitted via the multicast reference stream. The network interconnecting device 101 therefore obtains, from the multicast side stream, the chunk with the sequence number C, the chunk with the sequence number C+1 and the chunk with the sequence number C+2. Then, for the next transmission period, the network interconnecting device 101 switches back to the multicast reference stream. Said chunks are buffered by the network interconnecting device 101 for further transmission to the client device.

In a step 605, the network interconnecting device 101 detects a switching time period, i.e. the gap between successive frames of the multicast side stream.

The network interconnecting device 101 considers that a detected gap corresponds to an appropriate switching time period to switch back from the multicast side stream to the multicast reference stream, when the network interconnecting device 101 has obtained from the multicast side stream the same chunk as lastly transmitted via the multicast reference stream, as well as the chunk that was in error and any chunk that may exist in between. As already explained, the quantity of chunks to be obtained from the multicast side stream depends on the reactivity of the network interconnecting device 101 with regard to the error detection.

In a step 606, the network interconnecting device 101 switches back, during the switching time period, to the multicast reference stream. The network interconnecting device 101 has therefore temporarily switched to the concerned multicast side stream in order to obtain at least the chunk detected in error.

As shown in FIG. 6, the network interconnecting device 101 preferably performs such a switching operation by leaving the multicast side stream in a step 612 and by joining back the multicast reference stream in a step 613.

In a step 607, the network interconnecting device 101 obtains subsequent chunks from the multicast reference stream to which the network interconnecting device 101 has switched in the step 505. Said subsequent chunks are buffered by the network interconnecting device 101 for further transmission to the client device.

When the multicast side stream contains chunks of the same resolution as in the multicast reference stream, switching to the multicast side stream allows recovering from the erroneous chunk without any impact from the standpoint of the client device. The processing resources in use in the network interconnecting device 101 would increase until switching back to the multicast reference stream, since the multicast side stream contains more chunks than the multicast reference stream. When the multicast side stream contains chunks of lower resolution than in the multicast reference stream, switching to the multicast side stream allows recovering from the erroneous chunk without significant impact on the processing resources in use in the network interconnecting device 101, but with a short QoE degradation from the standpoint of the client device.

The invention claimed is:

1. A method for delivering an audio-video live content, time being divided into transmission periods, the audio-video live content being divided into chunks, wherein a server performs:
   obtaining at least one multicast reference stream intended to transport one chunk of the audio-video live content per transmission period;
   obtaining at least one multicast side stream intended to transport, for each transmission period, a plurality of chunks of the audio-video live content which at least comprises the same chunk as in each multicast reference stream and at least one preceding chunk; and
   synchronously transmitting each multicast reference stream and each multicast side stream along the transmission periods;
   wherein a device willing to receive the audio-video live content performs:
      joining one said multicast side stream for obtaining at least one chunk of the audio-video live content transmitted in a first transmission period; and
      only after leaving the multicast side stream, joining one said multicast reference stream for obtaining subsequent chunks of the audio-video live content which are transmitted from a second transmission period directly following the first transmission period such that the multicast side stream and the multicast reference stream are never joined at the same time.

2. The method according to claim 1, wherein the server obtains and transmits plural multicast reference streams transporting chunks in respective resolutions and a single multicast side stream, one multicast reference stream being selected to perform said switching according to a resolution of the audio-video live content desired by the device willing to receive the audio-video live content.

3. The method according to claim 2, wherein the multicast side stream transports chunks having a resolution identical as the lowest resolution of the audio-video live content transported among the multicast reference streams.

4. The method according to claim 2, wherein, the audio-video live content being compliant with the HyperText Transport Protocol Live Streaming format, each multicast reference stream includes in each transmission period a playlist compliant with the HyperText Transport Protocol Live Streaming format and the multicast side stream includes in each transmission period an aggregation of the playlists included in the multicast reference streams in said transmission period.

5. The method according to claim 2, wherein, the audio-video live content being compliant with the Smooth Streaming format, each multicast reference stream includes in each transmission period timestamp information compliant with the Smooth Streaming format and the multicast side stream includes in each transmission period a copy of the timestamp information included in any multicast reference stream in said transmission period.

6. The method according to claim 1, wherein the server obtains and transmits plural multicast reference streams transporting chunks in respective resolutions and plural multicast side streams transporting chunks in said respective resolutions, one multicast reference stream being selected to perform said switching according to the resolution of the chunks of the multicast side stream from which said switching is performed.

7. The method according to claim 6, wherein, the audio-video live content being compliant with the HyperText Transport Protocol Live Streaming format, each multicast reference stream includes in each transmission period a playlist compliant with the HyperText Transport Protocol Live Streaming format and each multicast side stream includes in each transmission period a copy of the playlist included, in said transmission period, in the multicast reference stream having the same resolution as said multicast side stream.

8. The method according to claim 6, wherein, the audio-video live content being compliant with the Smooth Streaming format, each multicast reference stream includes in each transmission period timestamp information compliant with the Smooth Streaming format and the multicast side stream includes in each transmission period a copy of the timestamp information included, in said transmission period, in the multicast reference stream having the same resolution as said multicast side stream.

9. The method according to claim 1, wherein the steps of the method performed by the device willing to receive the audio-video live content are initiated when the device willing to receive the audio-video live content starts accessing the audio-video live content.

10. The method according to claim 1, wherein the steps of the method performed by the device willing to receive the audio-video live content are initiated when the device willing to receive the audio-video live content already receives chunks of the audio-video live content via one said multicast reference stream, detects an error in one said received chunks and then switches temporary to one said multicast side stream to obtain at least the chunk detected in error.

11. The method according to claim 1, wherein, a network interconnecting device interconnecting a first network to a second network, a client device being connected to the first network, the server being connected to the second network, the device willing to receive the audio-video live content is the network interconnecting device on behalf of the client device and the network interconnecting device converting data received in a multicast way from the server into data transmitted in a unicast way to the client device.

12. The method according to claim 1, wherein, in one or more transmission periods, all of the chunks transported by each multicast side stream are transported in a reverse sequence order with regard to the audio-video live content.

13. The method according to claim 1, wherein, in each transmission period, all of the chunks transported by each multicast side stream are transported in a reverse sequence order with regard to the audio-video live content.

14. A system for delivering an audio-video live content, time being divided into transmission periods, the audio-video live content being divided into chunks, wherein the system comprises a server that is configured for:

obtaining at least one multicast reference stream intended to transport one chunk of the audio-video live content per transmission period;

obtaining at least one multicast side stream intended to transport, for each transmission period, a plurality of chunks of the audio-video live content which at least comprises the same chunk as in each multicast reference stream and at least one preceding chunk; and synchronously transmitting each multicast reference stream and each multicast side stream along the transmission periods;

wherein the system further comprises at least one device willing to receive the audio-video live content having:

joining one said multicast side stream for obtaining at least one chunk of the audio-video live content transmitted in a first transmission period; and only after leaving the multicast side stream, joining one said multicast reference stream for obtaining subsequent chunks of the audio-video live content which are transmitted from a second transmission period following the first transmission period such that the multicast side stream and the multicast reference stream are never joined at the same time.

15. A server intended to be used in a system for delivering an audio-video live content, time being divided into transmission periods, the audio-video live content being divided into chunks, wherein the server is configured for:

obtaining at least one multicast reference stream intended to transport one chunk of the audio-video live content per transmission period;

obtaining at least one multicast side stream intended to transport, for each transmission period, a plurality of chunks of the audio-video live content which at least comprises the same chunk as in each multicast reference stream and at least one preceding chunk; and synchronously transmitting each multicast reference stream and each multicast side stream along the transmission periods wherein the server is such that in each transmission period, all of the chunks transported by each multicast side stream are transported in a reverse sequence order with regard to the audio-video live content.

16. A device intended to be used in a system for delivering an audio-video live content, time being divided into transmission periods, the audio-video live content being divided into chunks, wherein said device is configured for:

joining a multicast side stream for obtaining at least one chunk of the audio-video live content transmitted in a first transmission period; and only after leaving the multicast side stream, joining a multicast reference stream for obtaining subsequent chunks of the audio-video live content which are transmitted from a second transmission period following the first transmission period such that the multicast side stream and the multicast reference stream are never joined at the same time, wherein the multicast reference stream transports one chunk of the audio-video live content per transmission period and the multicast side stream transports, for each transmission period, a plurality of chunks of the audio-video live content which at least comprises the same chunk as in the multicast reference stream and at least one preceding chunk, and wherein the multicast reference stream and the multicast side stream are synchronously transmitted along the transmission periods.

* * * * *